(12) United States Patent
Pappu et al.

(10) Patent No.: US 10,430,314 B2
(45) Date of Patent: Oct. 1, 2019

(54) FIRMWARE FINGERPRINTING BASED ON DATA MONITORED DURING FIRMWARE LOADING

(71) Applicant: Intel Corporation, Santa Clara, CA (US)

(72) Inventors: Lakshminarayana Pappu, Folsom, CA (US); Hem Vasant Doshi, Folsom, CA (US); Baruch Schnarch, Zichron-Ya'akov (IL)

(73) Assignee: Intel Corporation, Santa Clara, CA (US)

( * ) Notice: Subject to any disclaimer, the term of this patent is extended or adjusted under 35 U.S.C. 154(b) by 280 days.

(21) Appl. No.: 15/389,471

(22) Filed: Dec. 23, 2016

(65) Prior Publication Data

US 2018/0181479 A1   Jun. 28, 2018

(51) Int. Cl.

| | |
|---|---|
| *G06F 11/36* | (2006.01) |
| *G06F 21/55* | (2013.01) |
| *G06F 21/44* | (2013.01) |
| *G06F 11/07* | (2006.01) |
| *G06F 21/56* | (2013.01) |
| *G06F 21/57* | (2013.01) |
| *G06F 8/654* | (2018.01) |
| *G06F 21/60* | (2013.01) |

(52) U.S. Cl.
CPC .......... *G06F 11/3604* (2013.01); *G06F 8/654* (2018.02); *G06F 11/079* (2013.01); *G06F 11/0721* (2013.01); *G06F 21/44* (2013.01); *G06F 21/554* (2013.01); *G06F 21/565* (2013.01); *G06F 21/572* (2013.01); *G06F 11/364* (2013.01); *G06F 21/575* (2013.01); *G06F 21/606* (2013.01); *G06F 2221/034* (2013.01)

(58) Field of Classification Search
CPC ............. G06F 11/3027; G06F 11/3041; G06F 11/3089; G06F 11/3096; G06F 11/36; G06F 11/3604; G06F 11/364; G06F 21/572; G06F 21/606; G06F 21/575; G05B 19/58; H04L 63/14; H04L 63/1408; H04L 63/145; H04L 63/1483; H04L 63/12; H04L 63/123; H04L 2209/608; H04L 2209/605
See application file for complete search history.

(56) References Cited

U.S. PATENT DOCUMENTS 5,859,911 A * 1/1999 Angelo ............... G06F 12/1408
                                        711/E12.092
2004/0003262 A1* 1/2004 England ............... G06F 21/606
                                        713/189

(Continued)

OTHER PUBLICATIONS

Wikipedia's USB-C historical version published Dec. 22, 2016 https://en.wikipedia.org/w/index.php?title=USB-C&oldid=756151927 (Year: 2016).*

*Primary Examiner* — Joseph O Schell

(74) *Attorney, Agent, or Firm* — Patent Capital Group

(57) ABSTRACT

In one embodiment, a request may be received to load firmware on a microcontroller of a device. A firmware transfer may be initiated to load the firmware on the microcontroller. Data traffic may be monitored at one or more locations on a communication path associated with the firmware transfer. It may be determined whether the data traffic matches a digital fingerprint associated with the firmware.

25 Claims, 10 Drawing Sheets

(56) References Cited

U.S. PATENT DOCUMENTS

| | | | | |
|---|---|---|---|---|
| 2005/0120242 A1* | 6/2005 | Mayer | G06F 21/55 | 726/4 |
| 2005/0226421 A1* | 10/2005 | Briancon | H04L 63/12 | 380/270 |
| 2007/0143606 A1* | 6/2007 | Bandholz | G06F 21/85 | 713/168 |
| 2012/0005480 A1* | 1/2012 | Batke | G06F 21/572 | 713/175 |
| 2016/0034268 A1* | 2/2016 | Brown | G06F 8/65 | 717/169 |
| 2016/0188313 A1* | 6/2016 | Dubal | G06F 8/654 | 717/172 |

* cited by examiner

FIRMWARE FINGERPRINTING BASED ON DATA MONITORED DURING FIRMWARE LOADING

FIELD OF THE SPECIFICATION

This disclosure relates in general to the field of computer systems, and more particularly, though not exclusively, to loading firmware on electronic devices.

BACKGROUND

Many computer systems and other electronic devices are controlled by firmware. Firmware, for example, may be software that is designed for and/or embedded in a particular type of hardware, and may provide low-level control of the hardware. Thus, firmware is an essential component of many electronic devices. In some cases, firmware may be initially loaded on an electronic device during the manufacturing stage, and firmware may also be updated during the lifecycle of an electronic device. Accordingly, there is a demand for an efficient and secure mechanism for loading firmware on electronic devices.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Figure 1:
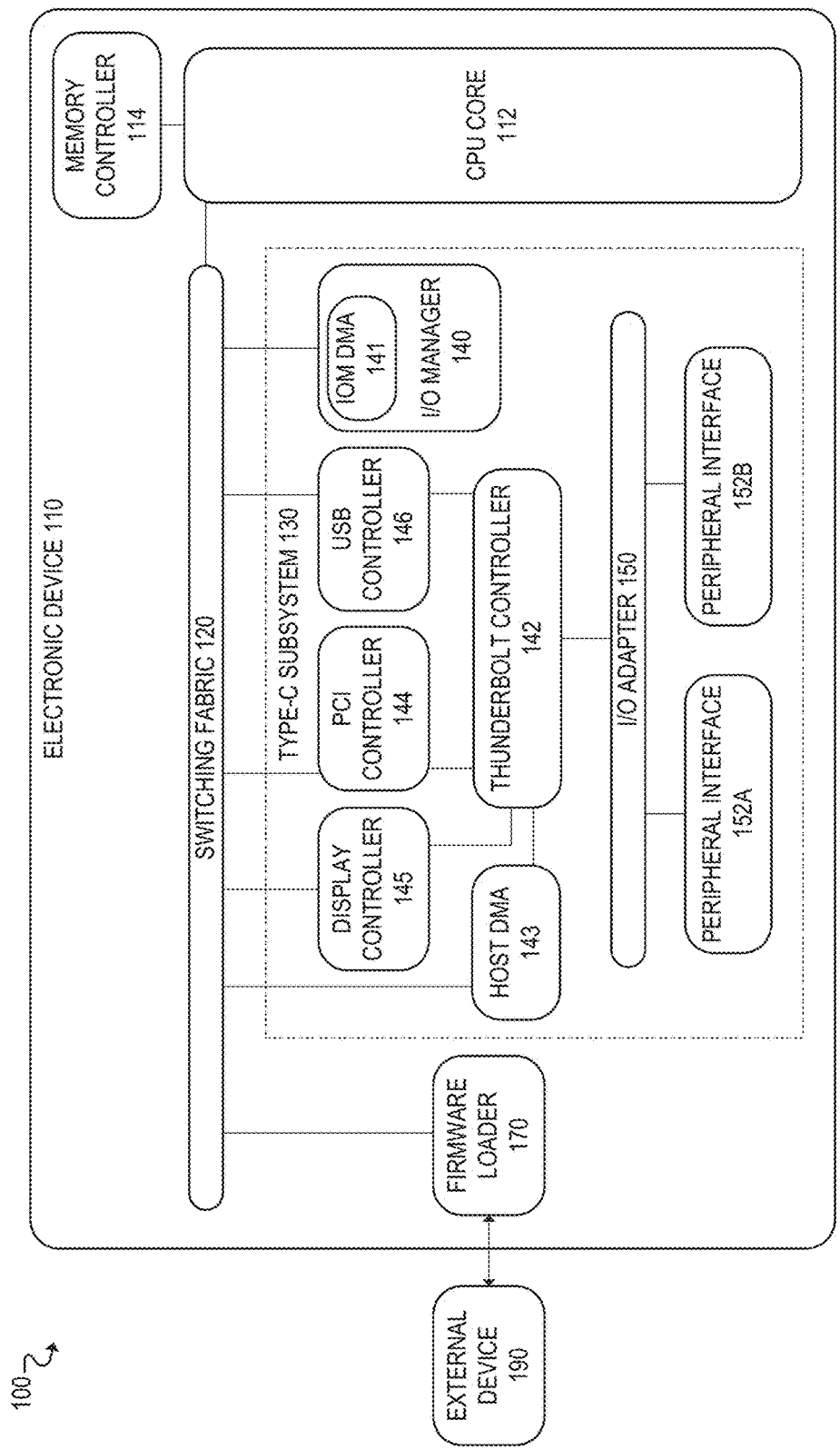
FIG. 1 illustrates a schematic diagram for an example embodiment of a computing system for loading firmware.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Example embodiments that may be used to implement the firmware loading and fingerprinting functionality of this disclosure will now be described with more particular reference to the attached FIGURES.

FIG. 1 illustrates a schematic diagram for an example embodiment of a computing system 100 for loading firmware. In some embodiments, for example, the firmware loading functionality described throughout this disclosure may be implemented by components of system 100, such as firmware loader 170, as described further below.

In the illustrated embodiment, computing system 100 includes electronic device 110 and external device 190. Electronic device 110 may be any suitable electronic device. In some embodiments, for example, electronic device 110 may be an integrated circuit, semiconductor chip, microprocessor, microcontroller, and/or any other electronic component or combination of electronic components. For example, in some embodiments, electronic device 110 may be a system-on-a-chip (SoC) that integrates various components of a computer or other electronic system into a single chip. In some embodiments, electronic device 110 may be associated with a computer, workstation, server, mainframe, virtual machine, embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device for processing and communicating data.

In the illustrated embodiment, electronic device 110 includes central processing unit (CPU) core 112, memory controller 114, switching fabric 120, type-C subsystem 130, and firmware loader 170.

CPU core 112 may include any combination of logic or processing elements operable to execute instructions, whether loaded from memory or implemented directly in hardware, such as a microprocessor, digital signal processor, field-programmable gate array (FPGA), graphics processing unit (GPU), programmable logic array (PLA), or application specific integrated circuit (ASIC), among other examples. Moreover, in some embodiments, CPU core 112 may be a multi-core processor that comprises a plurality of processor cores.

Memory controller 114 may be any controller (e.g., a microcontroller) or other component configured to facilitate access to system memory (e.g., main memory) associated with electronic device 110. System memory (not shown in FIG. 1), for example, may include any component or mechanism capable of storing data, including any type or combination of volatile and/or non-volatile storage, such as random access memory (RAM) (e.g., dynamic random access memory (DRAM), synchronous dynamic random access memory (SDRAM), static random access memory (SRAM)), read only memory (ROM), logic blocks of a field programmable gate array (FPGA), erasable programmable read only memory (EPROM), electrically erasable programmable ROM (EEPROM), and/or any suitable combination of the foregoing.

Switching fabric 120 may be a communication fabric or bus used to facilitate communication among components of electronic device 110 and peripheral devices connected to electronic device 110. For example, in some embodiments, switching fabric 120 may be used to facilitate communication between electronic device 110 and external device 190, or between electronic device 110 and other peripheral devices connected through peripheral interfaces 152.

Switching fabric 120 may include any wired or wireless interconnection fabric, bus, line, network, or other communication medium operable to carry data, signals, and/or power among electronic components. Moreover, in some embodiments, switching fabric 120 may comprise multiple interconnected switching fabrics.

Type-C subsystem 130 may be any component or collection of components capable of connecting electronic device 110 to other peripheral devices using type-C connectivity specifications. For example, in some embodiments, type-C subsystem 130 may utilize thunderbolt and USB type-C connectivity specifications. In the illustrated embodiment, type-C subsystem 130 includes input and output (I/O) manager (IOM) 140, thunderbolt controller 142, host direct memory access (host DMA) controller 143, display controller 145, peripheral component interconnect (PCI) controller 144, universal serial bus (USB) controller 146, input and output (I/O) adapter 150, and peripheral interfaces 152.

I/O manager (IOM) 140 may be a component configured to manage various microcontrollers and/or components of type-C subsystem 130, such as thunderbolt controller 142 and peripheral interfaces 152. In some embodiments, for example, IOM 140 may be a controller, such as a microcontroller. IOM 140 may also include an associated direct memory access controller (IOM DMA) 141 to enable direct memory access (DMA). IOM DMA 141, for example, may enable IOM 140 to directly access memory addresses associated with electronic device 110, such as memory addresses associated with system memory or peripheral devices (e.g., external device 190).

Thunderbolt controller 142 may be any controller or other component (e.g., a microcontroller) configured to facilitate communication with peripheral devices using the thunderbolt connectivity specification. In some embodiments, for example, thunderbolt controller 142 may enable multiple peripheral devices to be connected (and powered) through a single peripheral interface 152 using various connectivity standards and protocols (e.g., PCI express (PCIe), USB, HDMI, DisplayPort). In some embodiments, thunderbolt controller 142 may provide peripheral device connectivity using USB type-C interfaces and connectors (e.g., USB type-C peripheral interfaces 152).

Host DMA controller 143 may be any controller or other component (e.g., a microcontroller) configured to enable direct memory access (DMA) on electronic device 110. For example, host DMA 143 may enable internal and/or external components of electronic device 110 to directly access memory addresses associated with electronic device 110, such as memory addresses associated with system memory or peripheral devices (e.g., external device 190). For example, in some cases, host DMA 143 may provide direct memory access for thunderbolt controller 142 and/or peripheral devices connected using thunderbolt controller 142.

Display controller 145 may be any controller (e.g., a microcontroller) or other component configured to enable interaction and/or communication with a display. Display controller 145 may provide output in any suitable format, such as a coaxial output, composite video, component video, VGA, or digital outputs such as DVI or HDMI, by way of non-limiting examples. In some embodiments, display controller 145 may include, or may be integrated with, a graphics controller (e.g., a graphics processing unit (GPU)).

PCI controller 144 may be any controller (e.g., a microcontroller) or other component configured to facilitate communication with peripheral devices using a PCI-based connectivity specification, such as PCI express (PCIe).

USB controller 146 may be any controller or other component (e.g., a microcontroller) configured to facilitate communication with peripheral devices through peripheral interfaces 152 using a USB-based connectivity specification, such as USB type-C. In some embodiments, USB controller 146 may interface with peripheral interfaces 152 (and associated peripheral devices) either directly or through thunderbolt controller 142.

I/O adapter 150 may be an adapter configured to enable communication between internal components of electronic device 110 (e.g., thunderbolt controller 142) and peripheral I/O devices connected through peripheral interfaces 152. For example, in some embodiments, I/O adapter 150 may convert between the timing and protocol requirements of internal components of electronic device 110 and those of peripheral I/O devices.

Peripheral interfaces 152 may be communication interfaces for connecting peripheral devices to electronic device 110 (e.g., displays, mice, keyboards, printers, external storage, network controllers, cameras, microphones, speakers, sensors, and actuators, among other examples). For example, in some embodiments, peripheral interfaces 152 may include USB-based interfaces, such as USB type-C interfaces.

Firmware loader 170 may be any controller, circuitry, and/or other component of electronic device 110 that is capable of loading firmware on electronic device 110 and/or its associated components, as described further below.

External device 190 may be any device external to electronic device 110 that is used to load firmware on electronic device 110 through firmware loader 170, as described further below.

Many computer systems and other electronic devices, for example, are controlled by firmware. Firmware may be software that is designed for and/or embedded in a particular type of hardware (e.g., a microprocessor), and may provide low-level control of the hardware. Thus, firmware is an essential component of many electronic devices (e.g., electronic device 110). For example, a particular electronic device could include a type-C subsystem for connecting to other peripheral devices (e.g., type-C subsystem 130 of electronic device 110), and the type-C subsystem may be controlled by firmware. In some cases, firmware may be initially loaded on an electronic device during the manufacturing stage, and firmware may also be updated during the lifecycle of an electronic device. For example, firmware may be initially loaded during high volume manufacturing (HVM) and testing of an electronic device, which may involve loading and testing the firmware on a large number of electronic devices. During the lifecycle of an electronic device, the manufacturer or vendor may subsequently release updated firmware, which may need to be loaded on the existing electronic devices by other entities (e.g., other suppliers, distributors, and/or end-users). Moreover, in some cases, malicious actors may attempt to replace authentic firmware on an electronic device with malware in order to control the device in a malicious or unauthorized manner. Accordingly, there is a demand for an efficient and secure mechanism for loading firmware on electronic devices. This disclosure describes various embodiments for loading firmware on electronic devices in an efficient and secure manner.

In some embodiments, for example, the firmware loading functionality described throughout this disclosure may be implemented by components of system 100, such as firmware loader 170. Firmware loader 170 may enable firmware to be loaded on electronic devices in a fast and efficient manner. For example, in some cases, firmware may be loaded from an external device, such as an external testing device used to facilitate high volume manufacturing (HVM) and testing of electronic devices (e.g., external device 190). Moreover, in some embodiments, electronic devices may include a firmware loader (e.g., firmware loader 170) to load firmware directly from the external device to the appropriate component of the electronic devices (e.g., loading firmware from an external testing device to a particular microprocessor of an electronic device). For example, in some embodiments, the firmware loader of an electronic device may enable firmware to be loaded from an external device using direct memory access, but without accessing the primary system memory (e.g., random access memory (RAM)) or system storage (e.g., flash-based storage) associated with the electronic device. In this manner, firmware can be loaded on electronic devices faster than is possible using existing approaches. Moreover, firmware may be loaded on electronic devices even if primary system memory and/or storage is not available. For example, in some cases, firmware may be loaded on computer chips (e.g., systems-on-a-chip (SoC)) before the chips are connected or configured with a source of primary system memory and/or storage.

Moreover, some embodiments may include firmware fingerprinting functionality, which may be used for testing electronic devices and/or securely loading firmware on the electronic devices (e.g., electronic device 110). For example, in some embodiments, the official or authentic firmware for a particular electronic device may be uniquely identified using an associated digital fingerprint. Moreover, when loading firmware on the electronic device, the digital fingerprint associated with the official or authentic firmware may be compared to a digital fingerprint associated with the firmware that is ultimately loaded on the electronic device. For example, when firmware is being loaded on an electronic device, a digital fingerprint of the loaded firmware may be generated by monitoring data traffic at one or more locations on the communication path used to load the firmware. The authenticity of the loaded firmware may then be verified, for example, by comparing the digital fingerprint of the loaded firmware to the digital fingerprint of the official or authentic firmware, in order to determine whether the fingerprints match.

In some embodiments, firmware fingerprinting may be used for testing electronic devices. For example, in some cases, firmware fingerprinting may be used to detect faulty devices during high volume manufacturing (HVM) and testing of electronic devices. For example, firmware may be loaded on an electronic device during the manufacturing and testing stage, and the fingerprint of the loaded firmware may then be verified. If the firmware fingerprint verification fails, then a fault may be detected in the electronic device. For example, because firmware loaded by a manufacturer is presumably authentic and/or trusted, a failed fingerprint verification may indicate that a fault occurred in the electronic device during the firmware loading process. Moreover, in some cases, firmware fingerprinting may enable the source of the fault to be identified. For example, in some embodiments, a firmware fingerprint may be obtained from multiple locations on the communication path of the electronic device that is used to load the firmware. Thus, if the fingerprint verification fails for a particular location on the firmware loading path, then it may be determined that a fault occurred in a component associated with that location.

In some embodiments, firmware fingerprinting may also be used for securely loading and/or updating firmware on electronic devices. For example, a manufacturer or vendor may release updated firmware during the lifecycle of an electronic device, and other entities (e.g., other suppliers, distributors, and/or end-users) may need to load the updated firmware on existing instances of the electronic device. Thus, in some cases, firmware fingerprinting may be used to securely update the firmware on existing electronic devices, for example, by verifying the authenticity of firmware loaded on the electronic devices. In some embodiments, for example, if the digital fingerprint of the loaded firmware does not match the digital fingerprint of the official or authentic firmware, then the loaded firmware may be deemed unauthorized, and appropriate remedial measures may be taken. In some cases, for example, the unauthorized firmware may be associated with malware, and thus the attempt to load the unauthorized firmware on the electronic device may be aborted and/or blocked. Moreover, because the electronic device may be capable of loading firmware directly on the appropriate component or microprocessor without accessing primary system memory or storage, the malware may be unable to penetrate other components of the electronic device, such as the system memory or storage of the electronic device.

The firmware loading functionality described throughout this disclosure provides numerous technical advantages, including loading firmware on electronic devices in a fast, efficient, and secure manner. For example, loading firmware directly to the appropriate component of the electronic devices (e.g., without accessing system memory or storage) may enable firmware to be loaded faster. In some embodiments, for example, firmware may be loaded over 30 times faster than the existing approaches. The firmware loading functionality may also improve testing and security for electronic devices. For example, firmware fingerprinting may facilitate testing and debugging of electronic devices by identifying faulty devices and/or the source of the faults. Firmware fingerprinting may also facilitate secure loading and/or updating of firmware on electronic devices, which may prevent firmware-based malware attacks. Moreover, the firmware loading functionality may prevent malware from penetrating other components of the electronic devices, given that firmware can be loaded directly on the appropriate component of the electronic devices without accessing system memory and/or storage. Loading, testing, and updating firmware in a fast, efficient, and secure manner may reduce the time and personnel required for manufacturing and testing of electronic devices (e.g., HVM testing), prevent malware attacks, reduce costs (e.g., costs related to manufacturing, testing, and/or malware attacks), increase manufacturing volume, and ultimately increase profitability.

Figure 2A:
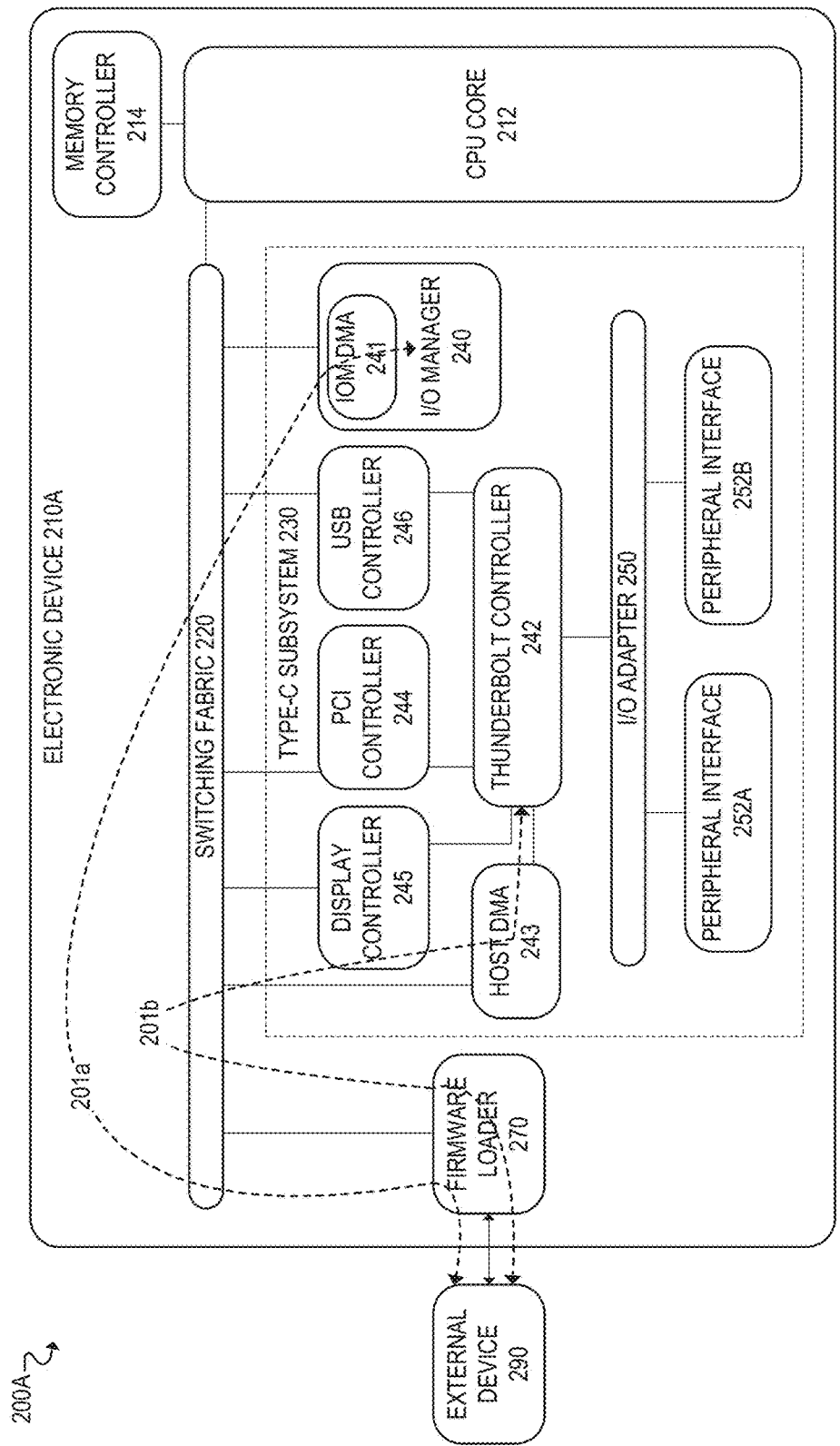
FIGS. 2A-B illustrate example embodiments for loading firmware.
Figure 2B:
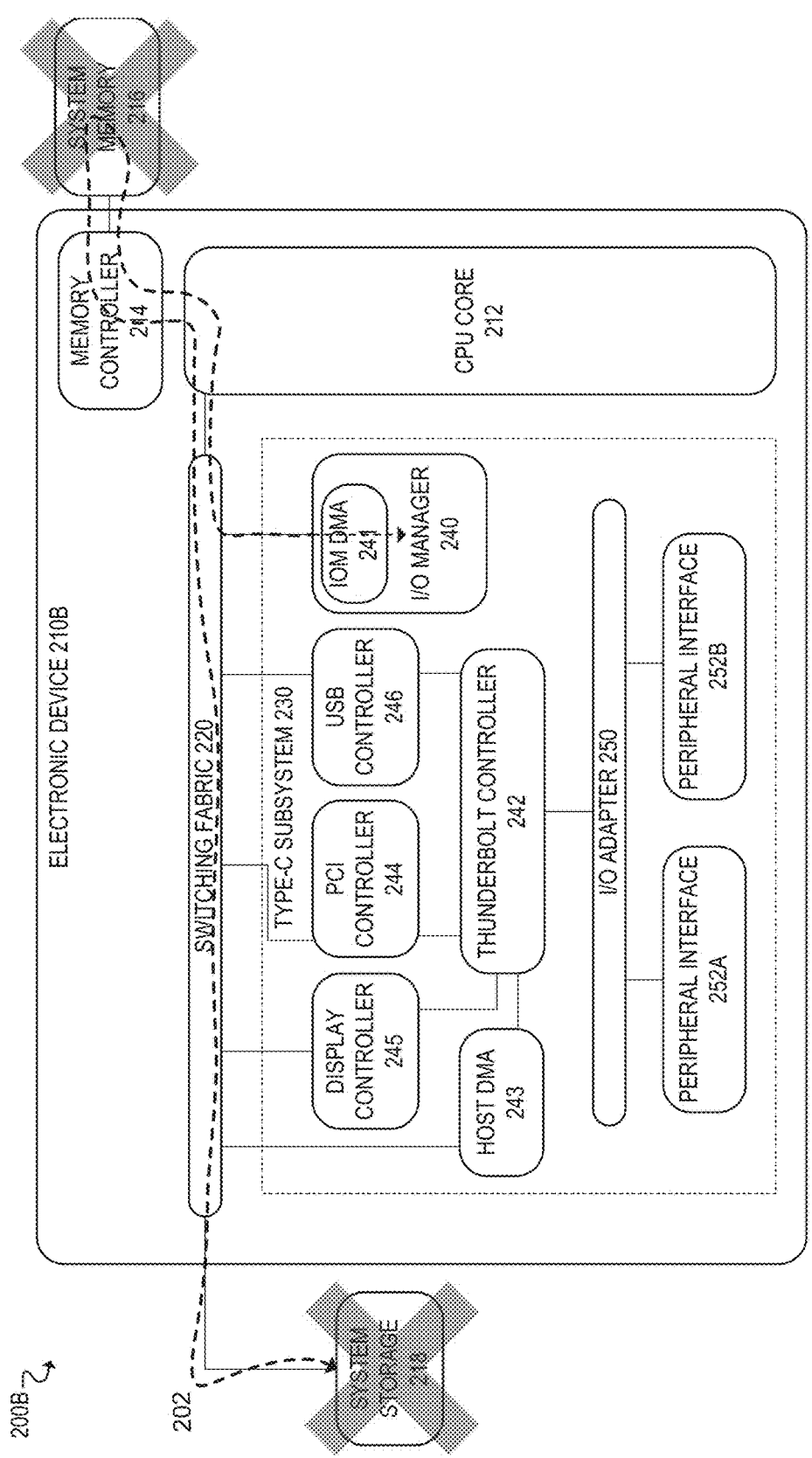

FIGS. 2A-B illustrate example embodiments 200A and 200B for loading firmware.

FIG. 2A illustrates an example embodiment 200A for loading firmware on electronic device 210A using firmware loader 270. In some embodiments, the components of FIG. 2A may be similar to the components of FIG. 1. Moreover, in some cases, firmware may be loaded on electronic device 210A from an external device 290, such as an external testing device used to facilitate high volume manufacturing (HVM) and testing of electronic devices. For example, external device 290 may contain firmware to be loaded on electronic device 210A, and external device 290 may be connected to electronic device 210A via firmware loader 270. Firmware loader 270 may be used to load firmware on electronic device 210A and its associated components. For example, in some cases, firmware loader 270 may be used to load firmware on microcontrollers of electronic device 210A, such as microcontrollers associated with type-C subsystem 230 of electronic device 210A (e.g., microcontrollers of I/O manager 240, thunderbolt controller 242, and/or peripheral interfaces 252). Moreover, in some embodiments, firmware loader 270 may be capable of loading firmware directly from external device 290 to the appropriate component of electronic device 210A using direct memory access, without accessing system memory (e.g., random access memory (RAM)) or system storage (e.g., flash-based storage) associated with electronic device 210A.

In the illustrated example, firmware loader 270 is used to load firmware on I/O manager (IOM) 240 and thunderbolt controller 242 of type-C subsystem 230 of electronic device 210A. The firmware for IOM 240, for example, is loaded by firmware loader 270 using IOM DMA controller 241. IOM DMA controller 241, for example, may enable firmware to be loaded on IOM 240 using direct memory access. For example, as depicted by firmware loading path 201a, firmware for IOM 240 is transferred from external device 290 to IOM 240 via firmware loader 270, switching fabric 220, and IOM DMA 241. Similarly, the firmware for thunderbolt controller 242 is loaded by firmware loader 270 using host DMA controller 243. Host DMA controller 243, for example, may enable firmware to be loaded on thunderbolt controller 242 using direct memory access. For example, as depicted by firmware loading path 201b, firmware for thunderbolt controller 242 is transferred from external device 290 to thunderbolt controller 242 via firmware loader 270, switching fabric 220, and host DMA controller 243.

Accordingly, firmware is loaded on I/O manager 240 and thunderbolt controller 242 using direct memory access, without accessing main system memory or storage associated with electronic device 210A.

FIG. 2B illustrates an example embodiment 200B for loading firmware on electronic device 210B, without using firmware loader 270 of FIG. 2A. For example, in the illustrated embodiment, firmware for I/O manager (IOM) 240 of electronic device 210B is loaded on IOM 240 from system storage 218 and through system memory 216. For example, as depicted by firmware loading path 202, the firmware for IOM 240 of electronic device 210B is first transferred from system storage 218 to system memory 216 (e.g., via switching fabric 220, CPU core 212 or an associated I/O processor, and memory controller 114), and is then transferred from system memory 216 to IOM 240 (e.g., via memory controller 214, CPU core 212 or an associated I/O processor, and IOM DMA 241). System storage 218, for example, may be a persistent data storage source used by electronic device 210B (e.g., flash-based storage), and system memory 216 may be the main memory used by electronic device 210B (e.g., random access memory (RAM)).

Accordingly, in the example embodiment of FIG. 2B, firmware is loaded on IOM 240 of electronic device 210B using primary system storage 218 and system memory 216, unlike the example embodiment of FIG. 2A where firmware is loaded directly on IOM 240 of electronic device 210A. Thus, in some cases, loading firmware using the example embodiment of FIG. 2B may be slower than loading firmware using the example embodiment of FIG. 2A. Moreover, unlike the example embodiment of FIG. 2A, the example embodiment of FIG. 2B requires system storage and system memory to be present in order to load firmware on electronic device 210B.

Figure 3:
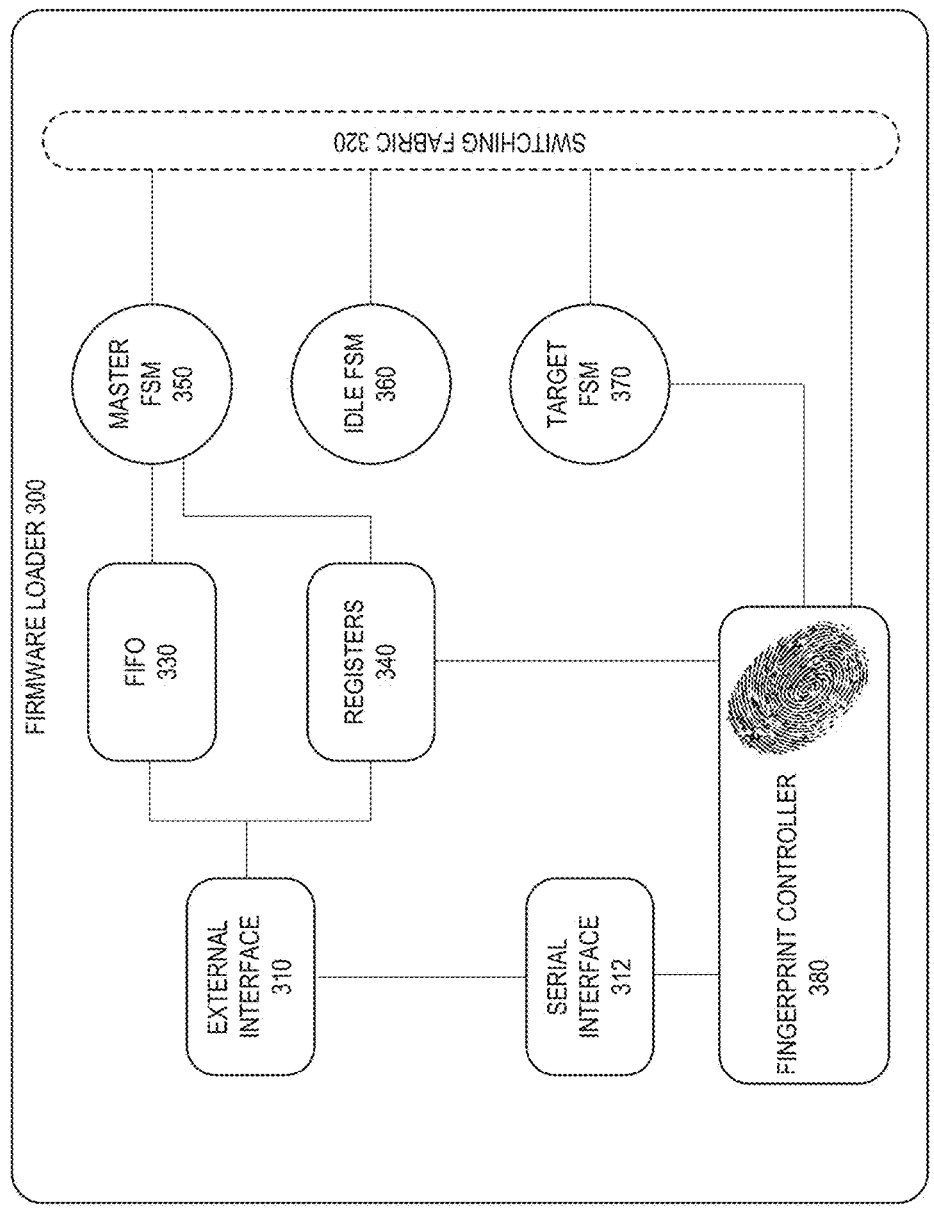
FIG. 3 illustrates an example embodiment of a firmware loader.

FIG. 3 illustrates an example embodiment of a firmware loader 300. Firmware loader 300, for example, may be used to implement the firmware loading and fingerprinting functionality described throughout this disclosure. For example, in some embodiments, firmware loader 300 may be used to implement the functionality of firmware loaders 170 of FIG. 1, 270 of FIG. 2A, and/or 670 of FIG. 6A. In some embodiments, firmware loader 300 may be a firmware loading controller in an electronic device (e.g., electronic device 110 of FIG. 1, 210A of FIG. 2A, and/or 610 of FIG. 6A). Firmware loader 300 may enable firmware to be loaded on an electronic device in a fast and efficient manner. For example, in some cases, firmware may be loaded on an electronic device from an external source, such as an external testing device used to facilitate high volume manufacturing (HVM) and testing of electronic devices. In some embodiments, firmware loader 300 may load firmware directly from the external device to the appropriate component of the electronic device (e.g., loading firmware from an external testing device to a particular microprocessor of an electronic device). For example, in some embodiments, firmware loader 300 may enable firmware to be loaded from an external device using direct memory access, but without accessing the primary system memory (e.g., random access memory (RAM)) or system storage (e.g., flash-based storage) associated with the electronic device.

In the illustrated embodiment, firmware loader 300 includes external interface 310, serial interface 312, FIFO buffer 330, registers 340, master finite state machine (FSM) 350, idle FSM 360, target FSM 370, and fingerprint controller 380. Moreover, firmware loader 300 may use switching fabric 320 to communicate with the host electronic device of firmware loader 300.

External interface 310 may be used, for example, to transfer firmware from an external device (e.g., external device 190 of FIG. 1, 290 of FIG. 2A, 410 of FIG. 4A, and/or 690 of FIG. 6A) to firmware loader 300. For example, in some embodiments, external interface 310 could be used for transferring firmware between external device 190 and firmware loader 170 of FIG. 1. In some embodiments, external interface 310 may be implemented using the firmware loading interface 400A of FIG. 4.

Serial interface 312 may be used for transmitting information from firmware loader 300 to the external firmware loading device, such as a digital fingerprint collected during a firmware loading transaction. For example, in some embodiments, firmware loader 300 may generate a digital fingerprint associated with a firmware loading transaction (e.g., using fingerprint controller 380 and/or associated fingerprint sensors), and the external device may then perform the firmware fingerprint verification. Accordingly, in those embodiments, the digital fingerprint associated with the firmware loading transaction may be transmitted from firmware loader 300 to the external device via return serial interface 312, in order to allow the external device to perform the firmware fingerprint verification.

FIFO buffer 330 may be used by firmware loader 300 as a storage buffer for data and commands received from external interface 310. For example, data and commands received via external interface 310 may be stored in FIFO buffer 330 until firmware loader 300 is ready to process the received data or commands. FIFO buffer 330 may be implemented by any data storage mechanism that uses a first in, first out (FIFO) data storage policy. For example, the data and/or commands stored in FIFO buffer 330 may be processed by firmware loader 300 in the order in which they are received and stored in FIFO buffer 330. Moreover, in some embodiments, data and commands may be separately buffered using different FIFO buffers 330.

Registers 340 may include, for example, various control registers used to control the firmware loading process. For example, when initiating a firmware transfer, control registers 340 may be used to specify the starting memory address of the firmware, and the size of the firmware (e.g., number of bytes). Once the starting memory address and size of the firmware are loaded into the appropriate control register(s) 340, the firmware transfer may be initiated. For example, in some embodiments, firmware loader 300 may notify a DMA controller that a DMA transfer is ready to be performed. Moreover, in some embodiments, control registers 340 may be used to specify commands, such as an "inject" command used to initiate a firmware transfer.

Idle FSM 360 may be a finite state machine that implements logic for controlling when transactions are allowed on switching fabric 320. Moreover, in some embodiments, idle FSM 360 may provide a protocol for clock gating and credit initialization.

Master FSM 350 may be a finite state machine that implements the logic of firmware loader 300 for outgoing call flows and transmissions from firmware loader 300 to the appropriate DMA controllers used for firmware transfers (e.g., IOM DMA 141 and/or host DMA 143 of FIG. 1). For example, in some embodiments, master FSM 350 may implement logic associated with the call flows of FIG. 5 that are illustrated from firmware loader 520 to DMA controller 530 (e.g., call flows 502b-e, 502i, 502m, and 502o). For example, when an "inject" command is received using a control register 340, master FSM 350 may be responsible for transmitting a corresponding firmware transfer request to the appropriate DMA controller using switching fabric 320. In some embodiments, master FSM 350 may also be responsible for negotiating credits for transferring data and/or commands over switching fabric 320. Moreover, when credits are allocated by switching fabric 320, master FSM 350 may be responsible for steering the unload pointer logic of FIFO buffer 330.

Target FSM 370 may be a finite state machine that implements the logic of firmware loader 300 for processing incoming call flows and transmissions from DMA controllers during firmware transfers (e.g., IOM DMA 141 and/or host DMA 143 of FIG. 1). For example, in some embodiments, target FSM 370 may implement logic for processing the call flows of FIG. 5 that are received by firmware loader 520 from DMA controller 530 (e.g., call flows 502f, 502j). For example, when a firmware transfer is initiated, a DMA controller may issue DMA fetch requests to firmware loader 300 for each byte or double word of the firmware that is being loaded. Accordingly, target FSM 370 may process the DMA fetch requests from the DMA controller in order to obtain the requested firmware data from the appropriate source, such as an external device used for loading firmware. Target FSM 370 may also be responsible for interacting with fingerprint controller 380 to enable the appropriate fingerprint sensors (e.g., fingerprint sensors 680 of FIGS. 6A-B) to generate fingerprints based on the incoming transactions (e.g., posted transactions, non-posted transactions, data transactions, commands, transaction lengths, and so forth).

Fingerprint controller 380 may be a controller used for generating and/or verifying digital fingerprints associated with firmware that is loaded by firmware loader 300. For example, in some embodiments, the official or authentic firmware for a particular component or microcontroller may be uniquely identified using an associated digital fingerprint. Moreover, when loading the firmware using firmware loader 300, the digital fingerprint associated with the official or authentic firmware may be compared to a digital fingerprint associated with the firmware that is ultimately loaded on the component. For example, fingerprint controller 380 may be responsible for generating a digital fingerprint of the loaded firmware based on data traffic monitored at one or more locations on the communication path used to load the firmware. Moreover, fingerprint controller 380 and/or other component(s) may then verify the authenticity of the loaded firmware, for example, by comparing the digital fingerprint of the loaded firmware to the digital fingerprint of the official or authentic firmware, in order to determine whether the fingerprints match. For example, in some embodiments, the fingerprint verification may be performed by fingerprint controller 380 of firmware loader 300, while in other embodiments, the fingerprint verification may be performed by another component. For example, in some embodiments, firmware loader 300 may transfer the generated fingerprint to an external device that was used to load the firmware, and the fingerprint verification may be performed by the external device. The firmware fingerprinting functionality of fingerprint controller 380 may be used, for example, for testing electronic devices and/or securely loading firmware on the electronic devices.

For example, in some cases, firmware fingerprinting may be used to detect faulty devices during high volume manufacturing (HVM) and testing of electronic devices. For example, firmware may be loaded on an electronic device during the manufacturing and testing stage, and the fingerprint of the loaded firmware may then be verified. If the firmware fingerprint verification fails, then a fault may be detected in the electronic device. For example, because firmware loaded by a manufacturer is presumably authentic and/or trusted, a failed fingerprint verification may indicate that a fault occurred in the electronic device during the firmware loading process. Moreover, in some cases, firmware fingerprinting may enable the source of the fault to be identified. For example, in some embodiments, a firmware fingerprint may be obtained from multiple locations on the communication path of the electronic device that is used to load the firmware. Thus, if the fingerprint verification fails for a particular location on the firmware loading path, then it may be determined that a fault occurred in a component associated with that location.

As another example, firmware fingerprinting may also be used for securely loading and/or updating firmware on a particular electronic component (e.g., a microprocessor). For example, a manufacturer or vendor may release updated firmware during the lifecycle of a particular component, and other entities (e.g., other suppliers, distributors, and/or end-users) may need to load the updated firmware on existing instances of the component. Thus, in some cases, firmware fingerprinting may be used to securely update the firmware on the existing components, for example, by verifying the authenticity of firmware that is loaded. In some embodiments, for example, if the digital fingerprint of the loaded firmware does not match the digital fingerprint of the official or authentic firmware, then the loaded firmware may be deemed unauthorized, and appropriate remedial measures may be taken. In some cases, for example, the unauthorized firmware may be associated with malware, and thus the attempt to load the unauthorized firmware may be aborted, blocked, undone, and/or reported (e.g., by notifying a user), among other examples. Moreover, because the electronic device may be capable of loading firmware directly on the appropriate component or microprocessor without accessing system memory or storage, the malware may be unable to penetrate other components of the electronic device, including the system memory or storage of the electronic device.

Figure 4A:
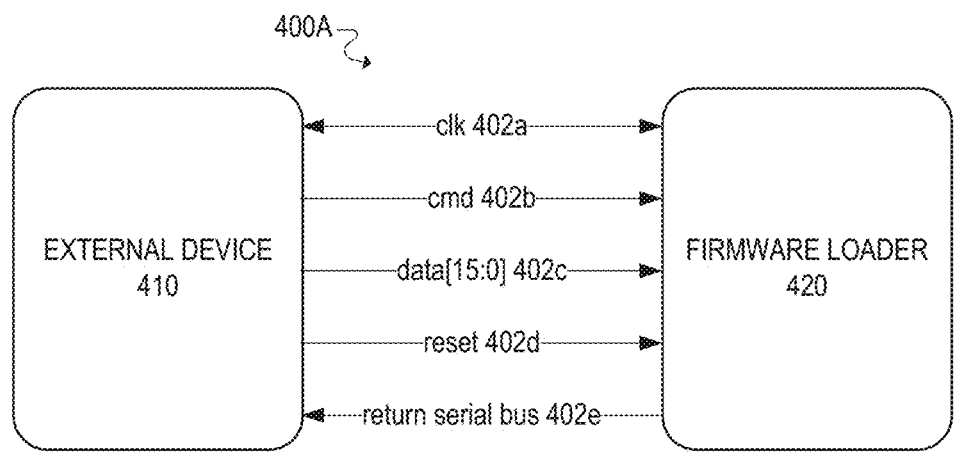
FIGS. 4A-B illustrate an example embodiment of an external firmware loading interface.
Figure 4B:
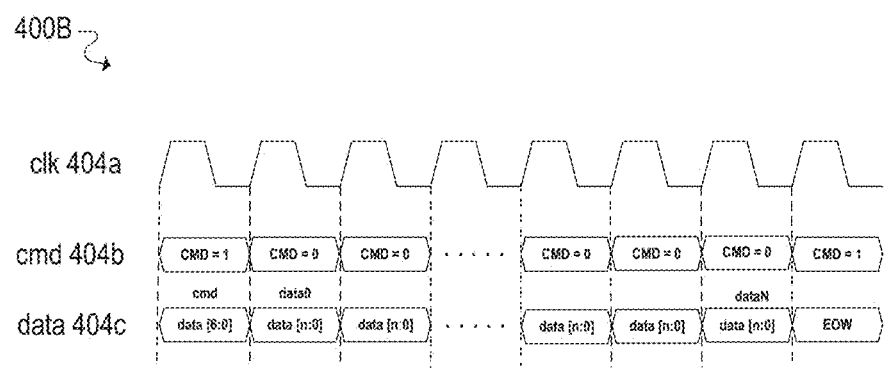

FIGS. 4A-B illustrate an example embodiment of an external firmware loading interface.

FIG. 4A illustrates firmware loading interface 400A and its associated signals 402. Firmware loading interface 400A may be used, for example, to transfer firmware from an external device 410 to a firmware loader 420 of an electronic device. For example, in some embodiments, firmware loading interface 400A could be used for transferring firmware between external device 190 and firmware loader 170 of FIG. 1. In the illustrated embodiment, firmware loading interface 400A includes clock signal 402a, command signal 402b, data signal 402c, reset signal 402d, and return serial bus signal 402e.

Clock signal 402a may be used to facilitate synchronous data transmission via firmware loading interface 400A. For example, clock signal 402a may be a timing signal that oscillates between high and low states (e.g., voltages) over a particular time interval or clock cycle.

Data signal 402c may be used for transmitting information from external device 410 to firmware loader 420, such as commands and data associated with a firmware loading transaction. In some embodiments, for example, data signal 402c may be configured to transmit 16-bits every clock cycle.

Command signal 402b may be used to identify when data signal 402c is being used to transmit a command. For example, in some embodiments, command signal 402b may have a value of "1" or "0" depending on whether a command is being transferred over data signal 402c. For example, command signal 402b may have a value of "1" when data signal 402c is being used to transmit a command, and a value of "0" when data signal 402c is NOT being used to transmit a command, such as when data signal 402c is being used to transmit data rather than a command (e.g., when transmitting firmware data).

Reset signal 402d may be used to reset various components (e.g., firmware loader 420) when a new firmware loading transaction is initiated.

Return serial bus signal 402e may be used for transmitting information from firmware loader 420 to external device 410, such as a digital fingerprint collected during a firmware loading transaction. For example, in some embodiments, a firmware fingerprint verification may be performed when firmware is loaded on an electronic device. Moreover, in some embodiments, firmware loader 420 (and/or associated fingerprint sensors) may generate the digital fingerprint associated with a firmware loading transaction, and external device 410 may then perform the firmware fingerprint verification. Accordingly, in those embodiments, the digital fingerprint associated with the firmware loading transaction may be transmitted from firmware loader 420 to external device 410 via return serial bus signal 402e, in order to allow external device 410 to perform the firmware fingerprint verification. In other embodiments, however, the firmware fingerprint verification may be performed by firmware loader 240. In those embodiments, for example, the fingerprint signature for the official or authentic firmware may either be obtained from external device 410 and/or persistently stored by firmware loader 420.

FIG. 4B illustrates an example timing diagram 400B associated with firmware loading interface 400A of FIG. 4A. Timing diagram 400B depicts clock signal 404a, command signal 404b, and data signal 404c.

Clock signal 404a is the timing signal of firmware loading interface 400A that is used to facilitate synchronous data transmission via firmware loading interface 400A. In the illustrated timing diagram, clock signal 404a oscillates between high and low states (e.g., voltages) over a particular time interval or clock cycle.

Command signal 404b is the signal of firmware loading interface 400A that is used to identify when data signal 404c is being used to transmit a command. For example, as described above, command signal 404b may have a value of "1" or "0" depending on whether a command is being transferred over data signal 404c. In the illustrated timing diagram, command signal 404b has a value of "1" in the first clock cycle, indicating that a command is contained in data signal 404c. In the subsequent clock cycles, command signal 404b has a value of "0," indicating that a command is not contained in data signal 404c. For example, during these clock cycles, data signal 404c may be used to transmit data associated with a command from a previous clock cycle (e.g., a command associated with the first clock cycle). For example, data signal 404c may be used to transmit data associated with firmware that is being loaded into response to a firmware loading command.

In the last clock cycle illustrated in the timing diagram, command signal 404b is again set with a value of "1," thus indicating that another command is contained in data signal 404c. For example, after using data signal 404c to complete a transfer of firmware data (e.g., a byte or double word) in response to a firmware load command, data signal 404c may then be used to send another command, and thus the command signal 404b is set with a value of "1."

The signals of firmware loading interface 400A may continue in this manner in order to synchronously transmit firmware loading command and data associated with those commands.

Figure 5:
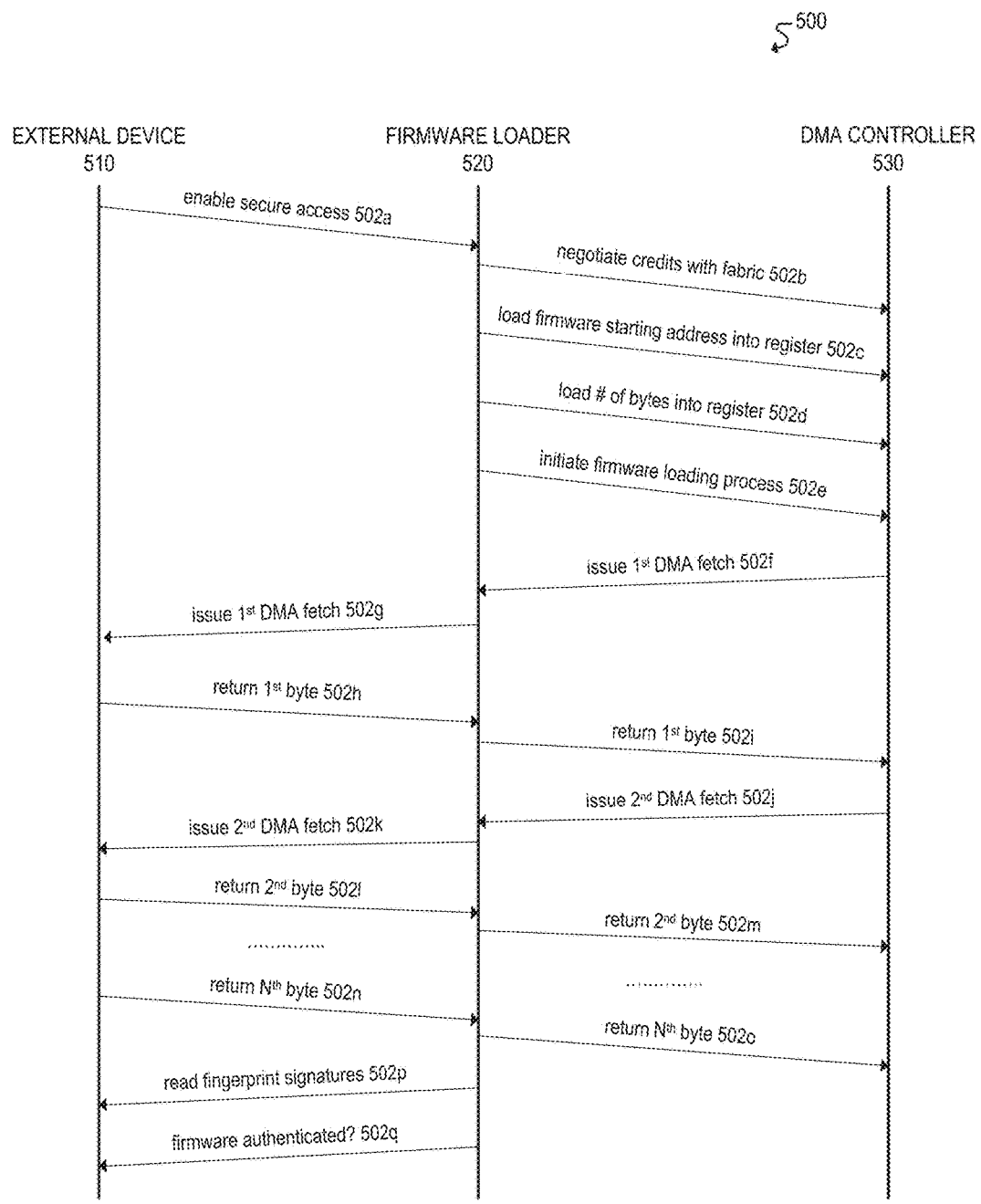
FIG. 5 illustrates a call flow for an example embodiment of firmware loading and fingerprinting.

FIG. 5 illustrates a call flow 500 for an example embodiment of firmware loading and fingerprinting. For example, call flow 500 illustrates the sequence of events and/or calls between external device 510, firmware loader 520, and DMA controller 530 of an electronic device. Call flow 500 may be implemented, in some embodiments, by components described throughout this disclosure (e.g., external device 190 of FIG. 1, firmware loader 170 of FIG. 1, firmware loader 300 of FIG. 3, DMA controllers 141 and 143 of FIG. 1, and/or fingerprint sensors 680 of FIGS. 6A-B).

The call flow may begin at call 502a, from external device 510 to firmware loader 520, to enable secure access to firmware loader 510 by external device 510. For example, in some embodiments, external device 510 may need to be authenticated before it can access firmware loader 510, to prevent unauthorized and/or malicious access of firmware loader 510 (e.g., using firmware loader 510 to load unauthorized firmware or malware). In some embodiments, external device 510 may be authenticated using a key associated with firmware loader 510.

The call flow may then proceed to call 502b, from firmware loader 520 to DMA controller 530, to negotiate credits with the switching fabric. For example, in some embodiments, the switching fabric may allocate credits to enable components of an electronic device to transfer data over the switching fabric.

The call flow may then proceed to call 502c, from firmware loader 520 to DMA controller 530, to load the starting memory address of the firmware into a control register. The call flow may then proceed to call 502d, from firmware loader 520 to DMA controller 530, to load the size of the firmware (e.g., number of bytes) into a control register. The call flow may then proceed to call 502e, from firmware loader 520 to DMA controller 530, to initiate the firmware loading process. For example, after the starting memory address and size of the firmware are loaded into registers, firmware loader 520 may notify DMA controller 530 that a DMA transfer is ready to be performed.

The call flow may then proceed to call 502f, from DMA controller 530 to firmware loader 520, to issue the $1^{st}$ data fetch for the firmware using direct memory access (DMA). For example, in some embodiments, direct memory access (DMA) may be implemented by fetching a single byte of memory at a time. Accordingly, each byte of the firmware may be fetched using a separate DMA data fetch. The call flow may then proceed to call 502g, where the $1^{st}$ DMA firmware data fetch is issued from firmware loader 520 to external device 510. The call flow may then proceed to call 502h, where the $1^{st}$ byte of the firmware is transferred from external device 510 to firmware loader 520. The call flow may then proceed to call 502i, where the $1^{st}$ byte of the firmware is transferred from firmware loader 520 to DMA controller 530. DMA controller 530 may then provide the $1^{st}$ byte of the firmware to the particular component of the electronic device that the firmware is being loaded on (e.g., a microprocessor of a type-C connectivity subsystem, such as a microprocessor of an I/O manager or thunderbolt controller).

The call flow may then proceed to call 502j, where the $2^{nd}$ DMA firmware data fetch is issued from DMA controller 530 to firmware loader 520. The call flow may then proceed to call 502k, where the $2^{nd}$ DMA firmware data fetch is issued from firmware loader 520 to external device 510. The call flow may then proceed to call 502l, where the $2^{nd}$ byte of the firmware is transferred from external device 510 to firmware loader 520. The call flow may then proceed to call 502m, where the $2^{nd}$ byte of the firmware is transferred from firmware loader 520 to DMA controller 530. DMA controller 530 may then provide the $2^{nd}$ byte of the firmware to the particular component of the electronic device that the firmware is being loaded on.

The call flow may then repeat in this manner for each byte of the firmware. Eventually, the call flow may proceed to call 502n, where the $N^{th}$ byte of the firmware (e.g., the last byte of the firmware) is transferred from external device 510 to firmware loader 520. The call flow may then proceed to call 502o, where the $N^{th}$ byte of the firmware is transferred from firmware loader 520 to DMA controller 530. DMA controller 530 may then provide the $N^{th}$ byte of the firmware to the particular component of the electronic device that the firmware is being loaded on.

The call flow may then proceed to call 502p, from firmware loader 520 to external device 510, to read the fingerprint signature associated with the official or authentic version of the firmware. For example, in some embodiments, the official or authentic version of the firmware may be uniquely identified using an associated digital fingerprint or signature. The digital fingerprint associated with the official or authentic version of the firmware may be compared to a digital fingerprint of the firmware that is ultimately loaded on the electronic device. For example, while firmware is being loaded on an electronic device, a digital fingerprint of the loaded firmware may be generated by monitoring data traffic at one or more locations on the communication path used to load the firmware. The authenticity of the loaded firmware may then be verified, for example, by comparing the digital fingerprint of the loaded firmware to the digital fingerprint of the official or authentic version of the firmware, in order to determine whether the fingerprints match.

The call flow may then proceed to call 502q, where firmware loader 520 notifies external device 510 whether the loaded firmware has been authenticated or verified based on the digital firmware fingerprint. In some embodiments, firmware fingerprinting may be used for device testing purposes, for example, by verifying that the firmware was successfully loaded on the electronic device and that no faults occurred. Moreover, in some embodiments, firmware fingerprinting may be used for security purposes, for example, to prevent unauthorized firmware or malware from being loaded on an electronic device.

Figure 6A:
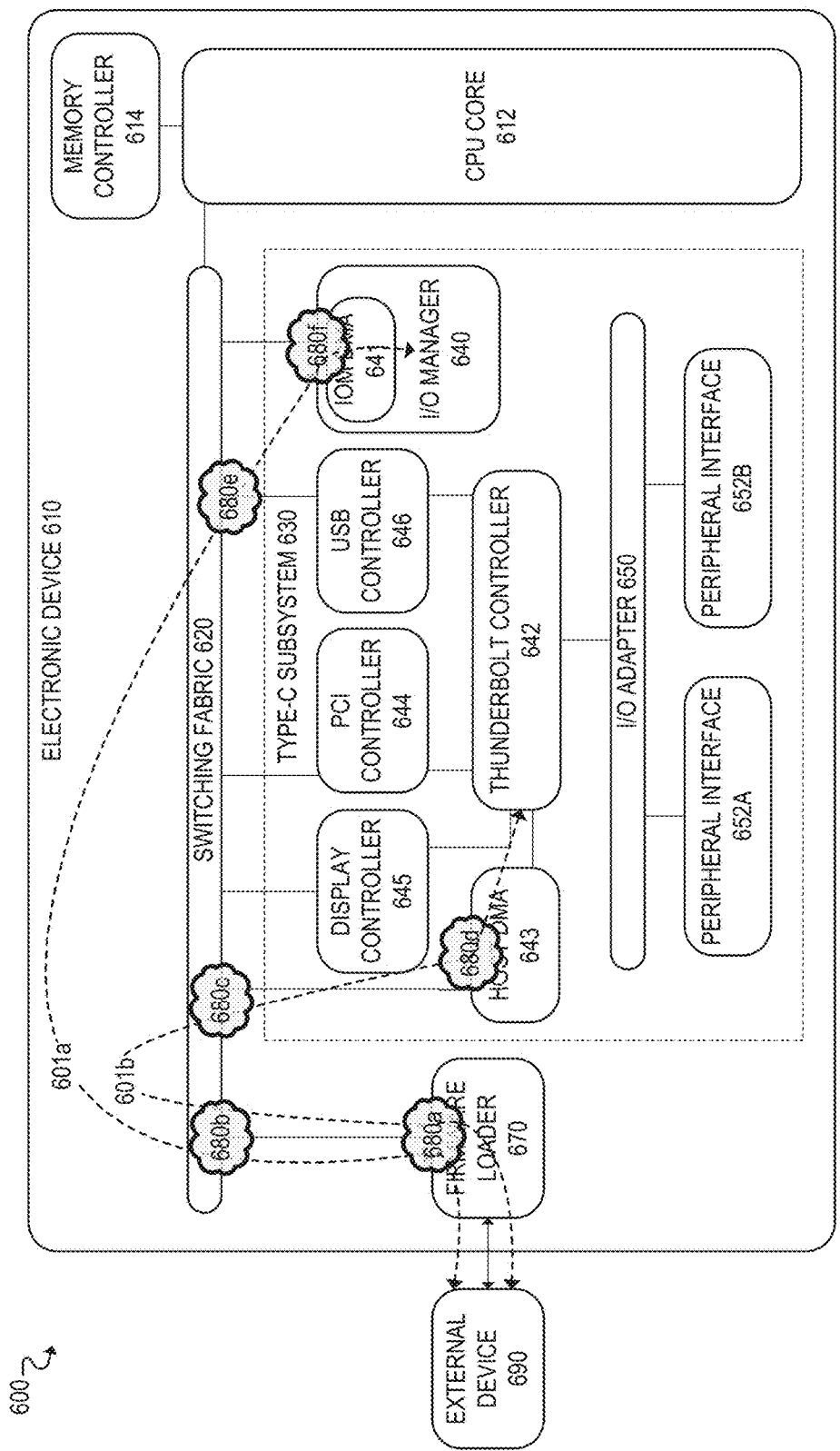
FIGS. 6A-B illustrate example embodiments of firmware fingerprinting.
Figure 6B:
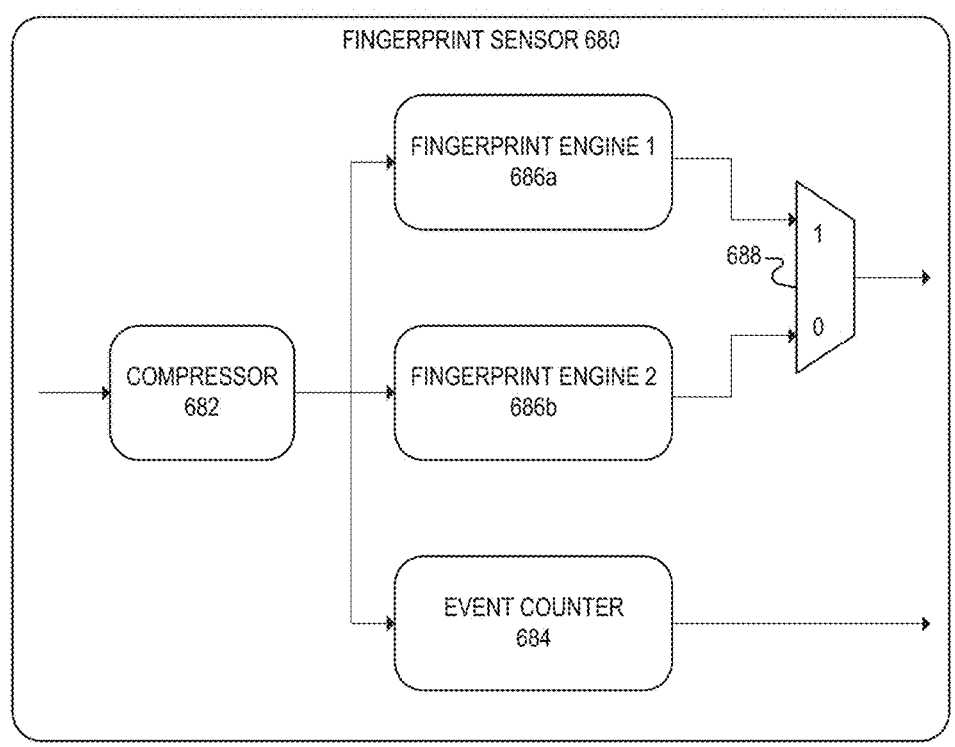

FIGS. 6A-B illustrate example embodiments of firmware fingerprinting.

FIG. 6A illustrates an example embodiment of firmware fingerprinting 600 on electronic device 610. In some embodiments, FIG. 6A and its associated components may be similar to FIG. 1 and its associated components. Accordingly, electronic device 610 may implement the firmware loading and fingerprinting functionality described throughout this disclosure.

The firmware fingerprinting functionality of electronic device 610, for example, may be implemented primarily by firmware loader 670 and fingerprint sensors 680. For example, when loading firmware on electronic device 610, a digital fingerprint associated with the official or authentic firmware may be compared to a digital fingerprint associated with the firmware that is ultimately loaded on the electronic device. In some embodiments, the digital fingerprint of the loaded firmware may be generated using fingerprint sensors 680 that monitor data traffic at one or more locations on the communication path used to load the firmware. For example, in the illustrated embodiment, fingerprint sensors 680a-f are placed in electronic device 610 throughout the communication paths used to load firmware on thunderbolt controller 642 and I/O manager 640. Fingerprint sensors 680 may each be used to generate a digital signature based on the data traffic at their respective locations of the communication path. A consolidated digital fingerprint may then be generated (e.g., by firmware loader 670) using the respective fingerprints from each fingerprint sensor 680. The authenticity of the loaded firmware may then be verified, for example, by comparing the digital fingerprint of the loaded firmware to the digital fingerprint of the official or authentic firmware, in order to determine whether the fingerprints match.

FIG. 6B illustrates an example embodiment of a fingerprint sensor 680. Fingerprint sensor 680 of FIG. 6B may be used, for example, to implement the functionality of fingerprint sensors 680a-f of FIG. 6A. For example, fingerprint sensor 680 may be placed along a communication path used to load firmware on an electronic device. Moreover, fingerprint sensor 680 may be used to generate a digital signature associated with the loaded firmware by monitoring the data traffic at its respective location of the communication path. In the illustrated embodiment, fingerprint sensor 680 includes compressor 682, event counter 684, fingerprint engines 686, and fingerprint engine selector 688.

Compressor 682 may be used to compress the data traffic that passes through the particular location of fingerprint sensor 680 on the communication path used for the firmware transfer. For example, during a firmware transfer, the data traffic transmitted through the particular location of fingerprint sensor 680 may be continuously supplied to compressor 682. Compressor 682 may then compress blocks of data traffic into smaller sized blocks using any suitable compression algorithm. For example, in some cases, compressor 682 may compress 512-bit blocks into 32-bit blocks.

Event counter 684 may be used to track or accumulate the number of bytes or double words that are transmitted through fingerprint sensor 680 during a firmware transfer. In this manner, the size of the transferred firmware data can be used as part of the fingerprint verification, for example, by verifying that the size of the transferred firmware equals the size of the official or authentic firmware.

Fingerprint engines 686 may be used to generate digital signatures associated with the data traffic transmitted through fingerprint sensor 680 during a firmware transfer. For example, fingerprint engines 686 may each use the compressed data output by compressor 682 to generate a digital fingerprint using a particular fingerprint algorithm. Some embodiments, for example, may include multiple fingerprint engines 686 (e.g., fingerprint engine 1 686*a* and fingerprint engine 2 686*b*) that each generate a digital fingerprint using different algorithms. In some embodiments, for example, fingerprint engines 686 may use different polynomial hashing algorithms to generate a digital signature (e.g., using larger and smaller polynomials in the respective algorithms of fingerprint engines 686). In some embodiments, the digital signature generated by each fingerprint engine 686 may be 32-bits.

Moreover, during a firmware transfer, each fingerprint engine 686 may be continuously calculating and outputting its digital signature as the data traffic passes through fingerprint sensor 680. For example, at a given point during the firmware transfer, the digital signature of each fingerprint engine 686 may be a function of both the prior data traffic that has been processed and the new incoming data traffic that has been received. Thus, the digital signatures generated by each fingerprint engine 686 may be continuously updated throughout a particular firmware transfer, until the transfer is complete.

Fingerprint engine selector 688 can be used to toggle the output of fingerprint sensor 680 between the respective digital signatures generated by fingerprint engines 1 and 2 (686*a* and 686*b*). For example, in some embodiment, a value of "1" may cause fingerprint engine selector 688 to output the digital fingerprint from fingerprint engine 1 686*a*, while a value of "0" may cause fingerprint engine selector 688 to output the digital fingerprint from fingerprint engine 2 686*b*. In this manner, the particular fingerprint algorithm used to generate the digital signature output by fingerprint sensor 680 can be configurable (e.g., by a firmware loader or other component of an electronic device).

Figure 7:
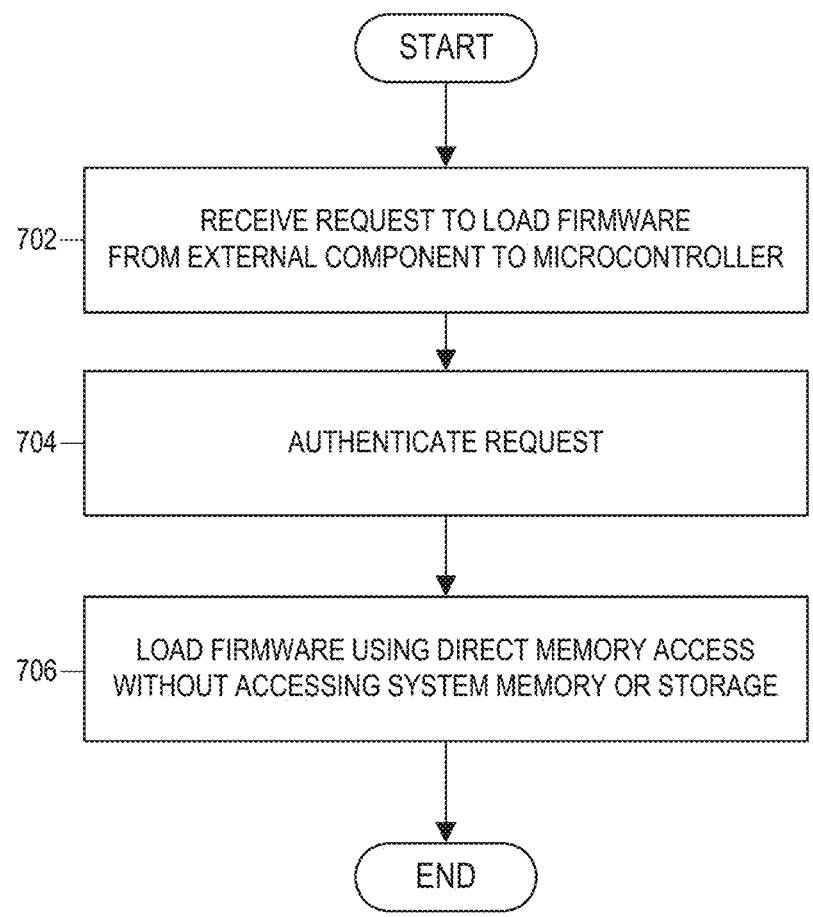
FIG. 7 illustrates a flowchart for an example embodiment of firmware loading.

FIG. 7 illustrates a flowchart 700 for an example embodiment of firmware loading. Flowchart 700 may be implemented, in some embodiments, by components described throughout this disclosure (e.g., computing system 100 of FIG. 1, firmware loader 170 of FIG. 1, firmware loader 300 of FIG. 3, and/or fingerprint sensors 680 of FIGS. 6A-B).

The flowchart may begin at block 702 by receiving a request to load firmware from an external component to a microcontroller of an electronic device. The microcontroller, for example, may be associated with a type-C connectivity subsystem of the electronic device, such as a microcontroller associated with an I/O manager, thunderbolt subsystem, USB subsystem, or physical interface, among other examples. Moreover, in some cases, firmware may be loaded from an external component, such as an external testing device used to facilitate high volume manufacturing (HVM) and testing of electronic devices.

The flowchart may then proceed to block 704 to authenticate the request to load firmware. In some embodiments, the external component may need to be authenticated before being allowed to load firmware on the electronic device, for example, to prevent unauthorized and/or malicious firmware or malware from being loaded on the device. For example, in some embodiments, the external component may be authenticated using a key associated with a firmware loader of the electronic device.

The flowchart may then proceed to block 706 to load firmware, from the external component to the microcontroller of the electronic device, using direct memory access without accessing the main system memory or storage associated with the electronic device. For example, in some embodiments, a firmware loader of the electronic device may be configured to load the firmware directly from the external component to the appropriate microprocessor of the electronic device using a direct memory access (DMA) controller. Moreover, in some embodiments, the firmware transfer may be initiated by loading certain information into control registers. For example, in some embodiments, the starting memory address of the firmware and the size of the firmware (e.g., number of bytes) may each be loaded into control registers, and the firmware transfer may then be initiated using a direct memory access (DMA) controller.

Moreover, in some embodiments, the external component may be connected to the firmware loader of the electronic device via an external interface. The external interface, for example, may enable the external component to transfer the firmware to the firmware loader, which may then transfer the firmware to the appropriate microprocessor of the electronic device using a direct memory access (DMA) controller. In some embodiments, the direct memory access (DMA) controller may be implemented or configured to fetch a single byte of memory at a time. Accordingly, in some embodiments, each byte of the firmware may be fetched from the external component, and over the external interface, using a separate DMA data fetch.

Moreover, in some embodiments, firmware fingerprinting may be used to verify the authenticity of the firmware loaded on the microcontroller. For example, when loading firmware on the electronic device, a digital fingerprint associated with the official or authentic version of the firmware may be compared to a digital fingerprint associated with the firmware that is ultimately loaded on the electronic device. The authenticity of the loaded firmware may then be verified, for example, based on whether the respective digital fingerprints match. In some embodiments, firmware fingerprinting may be used for device testing purposes, for example, by verifying that the firmware was successfully loaded on the electronic device and that no faults occurred. Moreover, in some embodiments, firmware fingerprinting may be used for security purposes, for example, to prevent unauthorized firmware or malware from being loaded on an electronic device.

At this point, the flowchart may be complete. In some embodiments, however, the flowchart may restart and/or certain blocks may be repeated. For example, in some embodiments, the flowchart may restart at block 702 to continue receiving and processing requests to load firmware.

Figure 8:
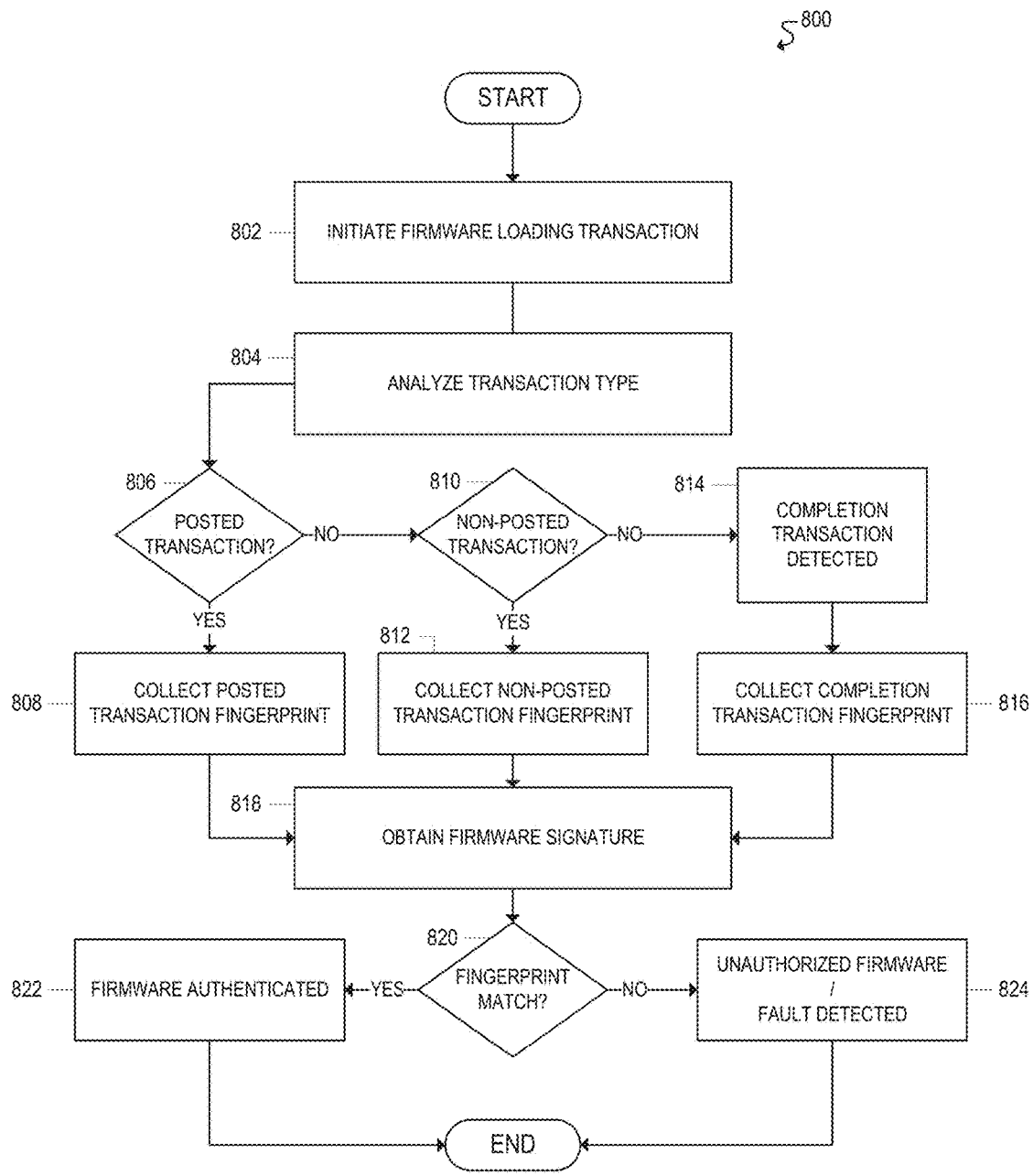
FIG. 8 illustrates a flowchart for an example embodiment of firmware fingerprinting.

FIG. 8 illustrates a flowchart 800 for an example embodiment of firmware fingerprinting. Flowchart 800 may be implemented, in some embodiments, by components described throughout this disclosure (e.g., computing system 100 of FIG. 1, firmware loader 170 of FIG. 1, firmware loader 300 of FIG. 3, and/or fingerprint sensors 680 of FIGS. 6A-B).

The flowchart may begin at block 802 by initiating a firmware loading transaction. For example, in some embodiments, a request may be received to load firmware on a microcontroller of an electronic device. The microcontroller, for example, could be associated with a type-c subsystem of the electronic device, or with any other component or subsystem of the electronic device. In some embodiments, the request to load firmware may first be authenticated. For example, in some embodiments, a firmware loading controller may authenticate the request to load the firmware using a key associated with the firmware loading controller.

A firmware transfer may then be initiated to load the firmware on the appropriate microcontroller. In some embodiments, a firmware loading controller may be used to load the firmware on the microcontroller. Moreover, in some embodiments, the firmware may be loaded using direct memory access without accessing system memory or system storage associated with the electronic device.

The flowchart may then proceed to block 804 to analyze the type of transaction associated with the firmware loading process. For example, in some embodiments, there may be various types of transactions associated with the firmware loading process, and firmware fingerprinting may be performed for each type of transaction. For example, in some embodiments, the firmware loading process may include posted transactions, non-posted transactions, and/or completion transactions. A posted transaction, for example, may be a transaction that does not require a response, such as when a firmware loading controller simply initiates the firmware loading process using a DMA controller (e.g., by loading the firmware starting address and size into control registers and then initiating the firmware transfer). A non-posted transaction, for example, may be a transaction that requires a response, such as when a DMA controller issues a request to a firmware loading controller to read firmware data (which requires the firmware data to be provided in response to the request). A completion transaction, for example, may be a transaction performed in response to a non-posted transaction, such as when the firmware loading controller provides the requested firmware data to the DMA controller.

Accordingly, the flowchart may proceed to block 806 to determine if the transaction is a posted transaction. If it is determined at block 806 that the transaction is a posted transaction, the flowchart may then proceed to block 808 to collect a fingerprint for the posted transaction.

If it is determined at block 806 that the transaction is not a posted transaction, the flowchart may then proceed to block 810 to determine if the transaction is a non-posted transaction. If it is determined at block 810 that the transaction is a non-posted transaction, the flowchart may then proceed to block 812 to collect a fingerprint for the non-posted transaction.

If it is determined at block 810 that the transaction is not a non-posted transaction, the flowchart may then proceed to block 814, where it may be determined that the transaction is a completion transaction. The flowchart may then proceed to block 816 to collect a fingerprint for the completion transaction.

The flowchart may then proceed to block 818 to obtain a firmware fingerprint signature. For example, in some embodiments, the official or authentic firmware for a particular electronic device may be uniquely identified using an associated digital fingerprint. Moreover, when loading firmware on the electronic device, the digital fingerprint associated with the official or authentic firmware may be compared to a digital fingerprint associated with the firmware that is ultimately loaded on the electronic device. In some embodiments, for example, a digital fingerprint associated with the firmware that is ultimately loaded on the electronic device may be determined using the various fingerprints collected at blocks 808, 812, and 816. For example, one or more fingerprint sensors may be used to monitor data traffic at one or more locations on a communication path associated with the firmware transfer. In some embodiments, for example, a plurality of fingerprint sensors may be used to monitor data traffic at a plurality of locations on the communication path associated with the firmware transfer. For example, the fingerprint sensors may be used to monitor data traffic at a firmware loading controller, DMA controller, switching fabric, and/or at the microcontroller that is being loaded with the firmware. Moreover, the one or more fingerprint sensors may be used to obtain the various fingerprints collected at blocks 808, 812, and 816.

The flowchart may then proceed to block 820 to determine whether there is a fingerprint match. For example, the authenticity of the loaded firmware may be verified by comparing the official or authentic digital fingerprint to the digital fingerprint of the loaded firmware (e.g., based on the data traffic monitored by the one or more fingerprint sensors), in order to determine whether the fingerprints match.

If it is determined at block 820 that there is a fingerprint match, the flowchart may then proceed to block 822, where the firmware is successfully authenticated.

If it is determined at block 820 that there is not a fingerprint match, the flowchart may then proceed to block 824, where it may be determined that the firmware is unauthorized and/or that a fault occurred during the firmware loading process.

For example, in some embodiments, the firmware fingerprinting may be used for securely loading and/or updating firmware on an electronic device. The authenticity of firmware loaded on the electronic device may be verified based on whether the official or authentic digital fingerprint of the firmware matches the digital fingerprint of the loaded firmware (e.g., based on whether the official fingerprint matches the fingerprint associated with the monitored data traffic of the loaded firmware). If the official or authentic digital fingerprint of the firmware does not match the digital fingerprint of the loaded firmware (e.g., the official fingerprint does not match the fingerprint associated with the monitored data traffic of the loaded firmware), then the loaded firmware may be deemed unauthorized, and appropriate remedial measures may be taken. In some cases, for example, the unauthorized firmware may be associated with malware, and thus a malware attack may be detected and the attempt to load the unauthorized firmware on the electronic device may be aborted and/or blocked.

Moreover, in some embodiments, the firmware fingerprinting may be used for testing purposes, for example, to detect faulty devices during high volume manufacturing (HVM) and testing of electronic devices. For example, firmware may be loaded on an electronic device during the manufacturing and testing stage, and the fingerprint of the loaded firmware may then be verified. If the firmware fingerprint verification fails (e.g., the monitored data traffic does not match the official digital fingerprint of the firmware), then a fault may be detected in the electronic device. For example, because firmware loaded by a manufacturer is presumably authentic and/or trusted, a failed fingerprint verification may indicate that a fault occurred in the electronic device during the firmware loading process. Moreover, in some cases, firmware fingerprinting may enable the source of the fault to be identified. For example, in some embodiments, a firmware fingerprint may be obtained from multiple locations on the communication path of the electronic device that is used to load the firmware. Thus, if the fingerprint verification fails for a particular location on the firmware loading path (e.g., the data traffic monitored at a particular location on the communication path does not match the official digital fingerprint of the firmware), then it may be determined that a fault occurred in a component associated with that location on the communication path.

At this point, the flowchart may be complete. In some embodiments, however, the flowchart may restart and/or certain blocks may be repeated. For example, in some embodiments, the flowchart may restart at block 802 to perform firmware fingerprinting for subsequent firmware loading transactions.

The flowcharts and block diagrams in the FIGURES illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or alternative orders, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing disclosure outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including a central processing unit (CPU) package. An SoC represents an integrated circuit (IC) that integrates components of a computer or other electronic system into a single chip. The SoC may contain digital, analog, mixed-signal, and radio frequency functions, all of which may be provided on a single chip substrate. Other embodiments may include a multi-chip-module (MCM), with a plurality of chips located within a single electronic package and configured to interact closely with each other through the electronic package. In various other embodiments, the computing functionalities disclosed herein may be implemented in one or more silicon cores in Application Specific Integrated Circuits (ASICs), Field Programmable Gate Arrays (FPGAs), and other semiconductor chips.

As used throughout this specification, the term "processor" or "microprocessor" should be understood to include not only a traditional microprocessor (such as Intel's® industry-leading x86 and x64 architectures), but also graphics processors, and any ASIC, FPGA, microcontroller, digital signal processor (DSP), programmable logic device, programmable logic array (PLA), microcode, instruction set, emulated or virtual machine processor, or any similar "Turing-complete" device, combination of devices, or logic elements (hardware or software) that permit the execution of instructions.

Note also that in certain embodiments, some of the components may be omitted or consolidated. In a general sense, the arrangements depicted in the figures should be understood as logical divisions, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor can execute instructions associated with data or microcode to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage may store information in any suitable type of tangible, non-transitory storage medium (for example, random access memory (RAM), read only memory (ROM), field programmable gate array (FPGA), erasable programmable read only memory (EPROM), electrically erasable programmable ROM (EEPROM), or microcode), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein should be construed as being encompassed within the broad terms 'memory' and 'storage,' as appropriate. A non-transitory storage medium herein is expressly intended to include any non-transitory special-purpose or programmable hardware configured to provide the disclosed operations, or to cause a processor to perform the disclosed operations. A non-transitory storage medium also expressly includes a processor having stored thereon hardware-coded instructions, and optionally microcode instructions or sequences encoded in hardware, firmware, or software.

Computer program logic implementing all or part of the functionality described herein is embodied in various forms, including, but in no way limited to, hardware description language, a source code form, a computer executable form, machine instructions or microcode, programmable hardware, and various intermediate forms (for example, forms generated by an HDL processor, assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL.

The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

Example Implementations

The following examples pertain to embodiments described throughout this disclosure.

One or more embodiments may include an apparatus, comprising: a microcontroller; one or more fingerprint sensors to monitor data traffic at one or more locations on a communication path associated with a firmware transfer; and a firmware loading controller to: receive a request to load firmware on the microcontroller; initiate the firmware transfer to load the firmware on the microcontroller; obtain, from the one or more fingerprint sensors, the data traffic monitored at the one or more locations on the communication path associated with the firmware transfer; and determine whether the data traffic matches a digital fingerprint associated with the firmware.

In one example embodiment of an apparatus, the one or more fingerprint sensors are further configured to monitor the data traffic at a plurality of locations on the communication path associated with the firmware transfer.

In one example embodiment of an apparatus, the one or more fingerprint sensors are further configured to monitor the data traffic at the firmware loading controller.

In one example embodiment of an apparatus, the one or more fingerprint sensors are further configured to monitor the data traffic at a switching fabric of the apparatus.

In one example embodiment of an apparatus, the one or more fingerprint sensors are further configured to monitor the data traffic at the microcontroller.

In one example embodiment of an apparatus, the firmware loading controller is further configured to detect a fault in the apparatus based on a determination that the data traffic does not match the digital fingerprint associated with the firmware.

In one example embodiment of an apparatus, the firmware loading controller is further configured to detect a source of the fault based on a determination that the data traffic at a particular location on the communication path does not match the digital fingerprint associated with the firmware.

In one example embodiment of an apparatus, the firmware loading controller is further configured to verify an authenticity of the firmware loaded on the microcontroller based on whether the data traffic matches the digital fingerprint associated with the firmware.

In one example embodiment of an apparatus, the firmware loading controller is further configured to detect a malware attack based on a determination that the data traffic does not match the digital fingerprint associated with the firmware.

In one example embodiment of an apparatus, the firmware loading controller is further configured to authenticate the request to load the firmware on the microcontroller using a key associated with the firmware loading controller.

In one example embodiment of an apparatus, the firmware loading controller is further configured to load the firmware on the microcontroller, wherein the firmware is loaded using direct memory access without accessing system memory associated with the apparatus.

In one example embodiment of an apparatus, the microcontroller is associated with a type-c subsystem of the apparatus.

One or more embodiments may include a method, comprising: receiving a request to load firmware on a microcontroller of a device; initiating a firmware transfer to load the firmware on the microcontroller; monitoring data traffic at one or more locations on a communication path associated with the firmware transfer; and determining whether the data traffic matches a digital fingerprint associated with the firmware.

In one example embodiment of a method, the data traffic is monitored at a plurality of locations on the communication path associated with the firmware transfer.

In one example embodiment of a method, the data traffic is monitored at a firmware loading controller of the device.

In one example embodiment of a method, the data traffic is monitored at a switching fabric of the device.

In one example embodiment of a method, the method further comprises detecting a fault in the device based on a determination that the data traffic does not match the digital fingerprint associated with the firmware.

In one example embodiment of a method, the method further comprises detecting a source of the fault based on a determination that the data traffic at a particular location on the communication path does not match the digital fingerprint associated with the firmware.

In one example embodiment of a method, the method further comprises verifying an authenticity of the firmware loaded on the microcontroller based on whether the data traffic matches the digital fingerprint associated with the firmware.

In one example embodiment of a method, the method further comprises detecting a malware attack based on a determination that the data traffic does not match the digital fingerprint associated with the firmware.

In one example embodiment of a method, the method further comprises loading the firmware on the microcontroller using a firmware loading controller of the device, wherein the firmware is loaded using direct memory access without accessing system memory associated with the device.

One or more embodiments may include a system, comprising: a processor; a type-c subsystem comprising a microcontroller; one or more fingerprint sensors to monitor data traffic at one or more locations on a communication path associated with a firmware transfer; and a firmware loading controller to: receive a request to load firmware on the microcontroller; initiate the firmware transfer to load the firmware on the microcontroller; obtain, from the one or more fingerprint sensors, the data traffic monitored at the one or more locations on the communication path associated with the firmware transfer; and determine whether the data traffic matches a digital fingerprint associated with the firmware.

In one example embodiment of a system, the one or more fingerprint sensors are further configured to monitor the data traffic at a plurality of locations on the communication path associated with the firmware transfer.

One or more embodiments may include at least one machine accessible storage medium having instructions stored thereon, the instructions, when executed on a machine, cause the machine to: receive a request to load firmware on a microcontroller of a device; initiate a firmware transfer to load the firmware on the microcontroller; monitor data traffic at one or more locations on a communication path associated with the firmware transfer; and determine whether the data traffic matches a digital fingerprint associated with the firmware.

In one example embodiment of a storage medium, the data traffic is monitored at a plurality of locations on the communication path associated with the firmware transfer.

What is claimed is:

1. An apparatus, comprising:
a microcontroller;
one or more fingerprint sensors to monitor data traffic at one or more locations on a communication path associated with a firmware transfer; and
a firmware loading controller to:
identify a request to load firmware on the microcontroller;
initiate the firmware transfer to load the firmware on the microcontroller;
obtain, from the one or more fingerprint sensors, the data traffic monitored at the one or more locations on the communication path associated with the firmware transfer;
generate, based on the data traffic monitored at one or more of the locations, a generated digital fingerprint related to the firmware; and
determine whether the generated digital fingerprint matches a digital fingerprint associated with the firmware.

2. The apparatus of claim 1, wherein the generated digital fingerprint is based on data traffic monitored at a plurality of locations on the communication path associated with the firmware transfer.

3. The apparatus of claim 1, wherein one of the one or more fingerprint sensors is to monitor the data traffic at the firmware loading controller.

4. The apparatus of claim 1, wherein one of the one or more fingerprint sensors is to monitor the data traffic at a switching fabric of the apparatus.

5. The apparatus of claim 1, wherein one of the one or more fingerprint sensors is to monitor the data traffic at the microcontroller.

6. The apparatus of claim 1, wherein the firmware loading controller is further to detect a fault in the apparatus based on a determination that the generated digital fingerprint does not match the digital fingerprint associated with the firmware.

7. The apparatus of claim 6, wherein the generated digital fingerprint is based on data traffic related to one location of the one or more locations.

8. The apparatus of claim 1, wherein the firmware loading controller is further to verify an authenticity of the firmware loaded on the microcontroller based on a determination that the generated digital fingerprint matches the digital fingerprint associated with the firmware.

9. The apparatus of claim 1, wherein the firmware loading controller is further to detect a malware attack based on a determination that the generated digital fingerprint does not match the digital fingerprint associated with the firmware.

10. The apparatus of claim 1, wherein the firmware loading controller is further to authenticate the request to load the firmware on the microcontroller using a key associated with the firmware loading controller.

11. The apparatus of claim 1, wherein the firmware loading controller is further to load the firmware on the microcontroller, wherein the firmware is loaded using direct memory access without accessing system memory associated with the apparatus.

12. The apparatus of claim 1, wherein the microcontroller is associated with a type-c subsystem of the apparatus.

13. A method, comprising:
identifying, by a firmware loading controller, a request to load firmware on a microcontroller of a device;
initiating, by the firmware loading controller a firmware transfer to load the firmware on the microcontroller;
identifying, by the firmware loading controller, data traffic related to one or more locations on a communication path associated with the firmware transfer;
generating, by the firmware loading controller, a generated digital fingerprint based on the data traffic; and
determining, by the firmware loading controller, whether the data traffic matches a digital fingerprint associated with the firmware.

14. The method of claim 13, wherein the data traffic is related to a plurality of locations on the communication path associated with the firmware transfer.

15. The method of claim 13, wherein one location of the one or more locations is at the firmware loading controller of the device.

16. The method of claim 13, wherein one location of the one or more locations is at a switching fabric of the device.

17. The method of claim 13, further comprising detecting, by the firmware loading controller, a fault in the device based on a determination that the generated digital fingerprint does not match the digital fingerprint associated with the firmware.

18. The method of claim 17, further comprising detecting, by the firmware loading controller, a source of the fault based on a determination that the data traffic at a particular location on the communication path does not match the digital fingerprint associated with the firmware.

19. The method of claim 13, further comprising verifying, by the firmware loading controller, an authenticity of the firmware loaded on the microcontroller based on whether the generated digital fingerprint matches the digital fingerprint associated with the firmware.

20. The method of claim 13, further comprising detecting, by the firmware loading controller, a malware attack based on a determination that the generated digital fingerprint does not match the digital fingerprint associated with the firmware.

21. The method of claim 13, further comprising loading, by the firmware loading controller, the firmware on the microcontroller using direct memory access without accessing system memory associated with the device.

22. A system, comprising:
a processor;
a type-c subsystem with a microcontroller;
a plurality of fingerprint sensors to monitor data traffic at respective locations on a communication path associated with a firmware transfer; and
a firmware loading controller to:
identify a request to load firmware on the microcontroller;
initiate the firmware transfer to load the firmware on the microcontroller;
obtain, from a plurality of fingerprint sensors, the data traffic monitored at the respective locations on the communication path associated with the firmware transfer;
generate, based on the data traffic, a generated digital fingerprint related to the firmware; and
determine whether the generated digital fingerprint matches a digital fingerprint associated with the firmware.

23. The system of claim 22, wherein the firmware loading controller is further to identify, based on whether the generated digital fingerprint matches the digital fingerprint, whether to load the firmware on the microcontroller.

24. One or more non-transitory computer-readable storage media having instructions stored thereon, wherein the instructions, when executed on a machine, are to cause the machine to:
identify a request to load firmware on a microcontroller of the machine;
initiate a firmware transfer to load the firmware on the microcontroller;
identify data traffic related to one or more locations on a communication path associated with the firmware transfer;
generate, based on the data traffic, a generated digital fingerprint related to the firmware;
determine whether the data traffic matches a digital fingerprint associated with the firmware; and
identify, based on whether the generated digital fingerprint matches the digital fingerprint, whether to load the firmware at the microcontroller.

25. The one or more non-transitory computer-readable storage media of claim 24, wherein the data traffic is related to at a plurality of locations on the communication path associated with the firmware transfer.

* * * * *